A. L. GAMMAGE.
WATER FILTER.
APPLICATION FILED APR. 23, 1915.

1,163,334. Patented Dec. 7, 1915.

Inventor.
Arthur L. Gammage
by his attorney

UNITED STATES PATENT OFFICE.

ARTHUR L. GAMMAGE, OF EVERETT, MASSACHUSETTS.

WATER-FILTER.

1,163,334.

Specification of Letters Patent. Patented Dec. 7, 1915.

Application filed April 23, 1915. Serial No. 23,524.

*To all whom it may concern:*

Be it known that I, ARTHUR L. GAMMAGE, a citizen of the United States, residing at Everett, in the county of Middlesex and State of Massachusetts, have invented certain new and useful Improvements in Water-Filters; and I do hereby declare the following to be a full, clear, and exact description of the invention, such as will enable others skilled in the art to which it appertains to make and use the same.

The present invention relates to water filters and more particularly to the filter bottom for supporting a bed of filtering material.

In the type of filter employed in connection with the present invention the water is filtered through a bed of sand or other suitable material which is cleansed periodically by washing water which is caused to flow in a direction opposite to the direction of flow of the filtered water. It is desirable that the filter bottom which supports the filtering bed shall offer a minimum resistance to the passage of the filtered water and wash water without upon the other hand permitting sand or gravel to pass therethrough. In addition, the filtering bed is cleansed by injecting wash water through the filter bottom at a sufficient pressure to cause the water to flow upwardly through the bed of sand, removing all of the accumulated foreign material. In order to secure the most efficient cleansing of the filtering bed it is essential that the filter bottom shall be constructed in a manner to distribute the wash water over the entire area of the filtering bed after it leaves the filter bottom.

The object of the present invention is to provide an improved form of filter bottom which supports the bed of filtering material and offers a minimum resistance to the passage of water therethrough, which effects a uniform distribution of the wash water over the entire area of the filtering bed and which may be made at a comparatively low cost.

With this object in view the several features of the invention consist in certain novel features of construction, combinations and arrangements of parts hereinafter described and claimed, the advantages of which will be obvious to those skilled in the art from the following description.

Figure 1:
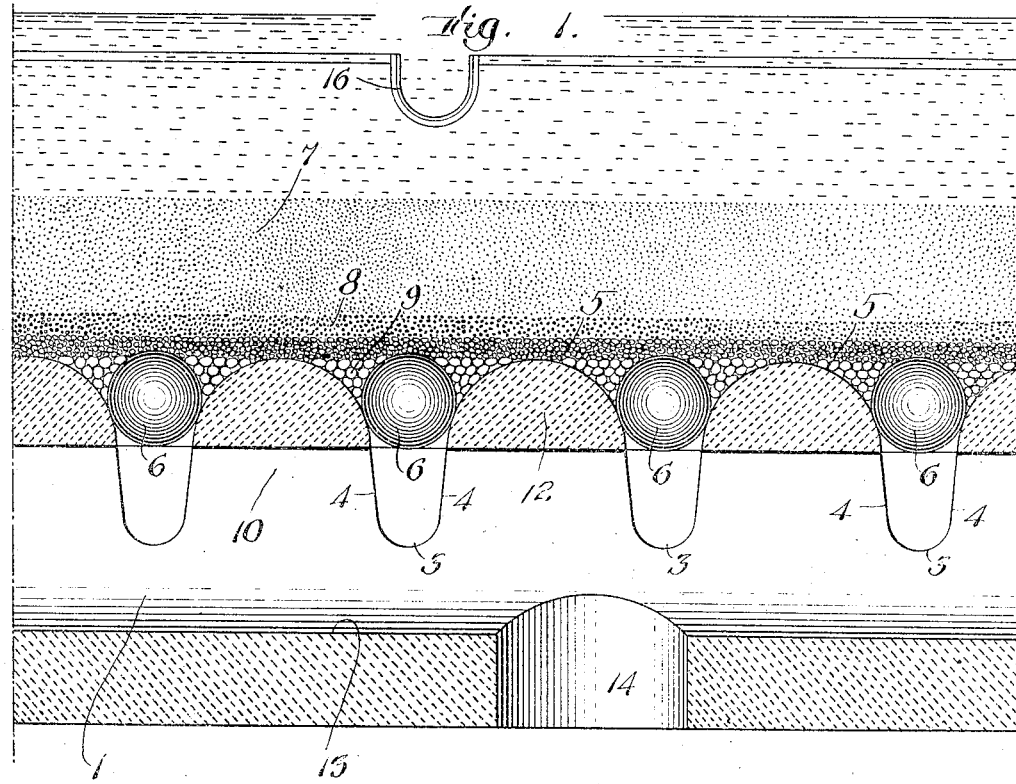
Figure 2:
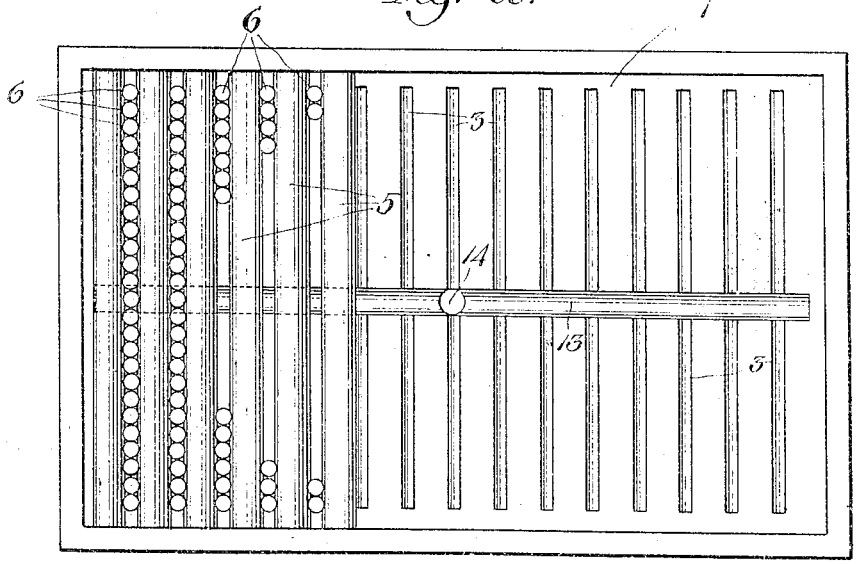

In the accompanying drawings illustrating the preferred form of the invention;

Figure 1 represents a longitudinal section in elevation of the filter bottom with the filter bed supported thereon; and Fig 2 represents a top plan view of the improved form of filter bottom.

The filter bottom shown in the illustrated embodiment of the invention is provided with an effluent water passage extending across the filter, and a single row of contiguous spheres supported by opposite walls of the passage above the bottom and arranged to support a bed of sand or other filtering material. In the most efficient form of the invention which has yet been devised the filter bottom is provided with a series of lateral effluent water passages extending across the filter, arched surfaces connecting adjacent lateral passages, and a row of contiguous spheres bridging each passage and supported by the oppositely arched surfaces to provide a support for the bed of filtering material. With this construction the filtered water percolates through the bed of filtering material which is supported by the contiguous spheres and is then collected in the effluent passages which discharge in any suitable manner. When it is desired to cleanse the bed of filtering material, washing water is delivered through the lateral passages in the filter bottom at a pressure sufficient to force the water up through the bed of filtering material. The washing water passes around the contiguous spheres and is distributed by the spheres and the opposite arched surfaces forming the walls of the passages into intimate engagement with all portions of the filter bed. The provision of the coöperating spheres and curved surfaces distributes the wash water so effectively that a mechanical or other agitation of the filter bed is rendered unnecessary and the bed is thoroughly cleansed by the passage of the water therethrough. In the illustrated embodiment of the invention the filter bottom indicated at 1 is made of concrete or other suitable material and is provided with a series of lateral effluent water passages 2 formed therein and having upwardly diverging walls 4. The adjacent water passages are connected by arched surfaces 5 and a single row of spheres 6 is supported by the oppositely arched surfaces above each lateral passage. As shown clearly in the drawings the spheres 6 are arranged in contiguous relation with one another and are so proportioned with respect to the width of the passages that the tops of the spheres 6 are located at approximately the same height as the top of the arched surfaces 5. This provides a suitable support for the filtering bed which preferably consists of a layer of sand indicated at 7 and an interposed stratum 8 of gravel or other suitable material graded as shown in the drawings. The interstices between the spheres and the arched surfaces are preferably filled with larger pebbles or crushed rock indicated at 9. In the illustrated embodiment of the invention the filter bottom is conveniently formed of a bed of concrete 10 having the lateral passages 3 formed therein, and a series of half cylinders 12 formed of concrete or other suitable material and supported upon the bed 10 between the lateral passages to form the arched surfaces connecting the passages, as shown clearly in the drawings. The several lateral passages all communicate with a main passage 13 formed in the filter bed 10 and extending longitudinally beneath the semi-cylindrical blocks 12. The main passage is connected with a suitable effluent pipe through the delivery opening 14 and by providing a plurality of valves and connecting pipes, as well known in the art, the discharge of the filtered water and the intake of the wash water may be suitable controlled.

During the filtering operation the water is supported upon the filtering bed at a depth to provide sufficient head for forcing the water through the filtering bed, causing it to flow into the effluent passages, and this height is maintained by delivering water through the wash water gutter indicated at 16 and connected with suitable influent pipes. During the cleansing of the filtering bed the wash water is introduced from beneath the bed with a pressure sufficient to force the water up through the bed and elevate the water sufficiently to cause it to flow out through the wash water gutter 16 without elevating the filtering bed sufficiently to discharge the sand through the wash water gutter. This operation is greatly facilitated by the construction of the filter bottom as the spheres are preferably made of concrete and are of sufficient weight to cause them to be maintained in place under the pressure of the wash water from beneath. At the same time, the spheres present a large surface area to the wash water, which, in conjunction with the arched surfaces, causes an effective distribution of the wash water to take place throughout the entire body of filtering material.

It should be understood that although the members 6 are shown in the drawings and disclosed in the specification and claims as spheres, the invention is not to be considered as limited to exact spherical bodies, but is intended to cover all bodies of an approximate spherical form which serve the function of the spheres. Furthermore, the term "contiguous" as applied to the location of the spheres is intended to cover an arrangement in which the spheres may be located in close proximity to one another, as well as an arrangement in which the spheres are in actual contact.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:—

1. A filter bottom for pure water filters, having an effluent water passage extending across the filter, and a single row of contiguous spheres supported by opposite walls of the passage above the bottom and arranged to support a bed of filtering material.

2. A filter bottom for pure water filters, having an effluent water passage extending across the filter and provided with upwardly diverging walls, and a single row of contiguous spheres supported by opposite diverging walls of the passage above the bottom and arranged to support a bed of filtering material.

3. A filter bottom for pure water filters, having a series of effluent water passages extending across the filter, arched surfaces connecting adjacent passages, and a row of contiguous spheres bridging each passage and supported by the oppositely arched surfaces to provide a support for the bed of filtering material.

4. A filter bottom for pure water filters, having a series of effluent water passages extending across the filter, arched surfaces connecting adjacent passages, and a row of contiguous spheres bridging each passage and supported by the oppositely arched surfaces with the tops of the spheres located at approximately the same height as the top of the arched surfaces to provide a support for the bed of filtering material.

5. A filter bottom for pure water filters, having a bed provided with a series of effluent water passages formed therein, a plurality of half cylinders supported upon the bed between the passages, and a row of contiguous spheres bridging each passage and supported by the oppositely arched surfaces of the half cylinders to provide a support for the bed of filtering material.

ARTHUR L. GAMMAGE.